(12) United States Patent
Huang et al.

(10) Patent No.: US 11,373,550 B2
(45) Date of Patent: Jun. 28, 2022

(54) AUGMENTED REALITY TRAINING SYSTEM

(71) Applicant: Yu-Hsuan Huang, Taipei (TW)

(72) Inventors: Yu-Hsuan Huang, Taipei (TW);
Hao-Yu Chang, Taipei (TW)

(73) Assignee: Yu-Hsuan Huang, Taipei (TW)

( * ) Notice: Subject to any disclaimer, the term of this patent is extended or adjusted under 35 U.S.C. 154(b) by 615 days.

(21) Appl. No.: 16/390,407

(22) Filed: Apr. 22, 2019

(65) Prior Publication Data
US 2019/0325785 A1    Oct. 24, 2019

Related U.S. Application Data

(60) Provisional application No. 62/661,511, filed on Apr. 23, 2018.

(51) Int. Cl.
*G09B 23/28*     (2006.01)
*G06F 3/01*      (2006.01)
*G06T 19/00*     (2011.01)

(52) U.S. Cl.
CPC .............. *G09B 23/28* (2013.01); *G06F 3/011* (2013.01); *G06T 19/006* (2013.01)

(58) Field of Classification Search
CPC ........ G09B 23/28; G06F 3/011; G06T 19/006
See application file for complete search history.

(56) References Cited

U.S. PATENT DOCUMENTS

2008/0297535 A1    12/2008  Reinig
2010/0001998 A1*   1/2010   Mandella ............ G06F 3/03545
                                              345/419

(Continued)

FOREIGN PATENT DOCUMENTS

TW              I576787 B  *  4/2017

OTHER PUBLICATIONS

European Communication corresponding to EP Application No. 191703206 dated Mar. 5, 2021. (p. 7).

(Continued)

*Primary Examiner* — Chong Wu
(74) *Attorney, Agent, or Firm* — Muncy, Geissler, Olds & Lowe, P.C.

(57) ABSTRACT

Disclosed is an augmented reality training system, which includes a manipulation platform, an augmented reality stereo microscopic assembly, an instrument tracking module and a simulation generation module. The augmented reality stereo microscopic assembly is configured for camera-based capture of real stereo videos and for optical transmission of augmented reality images into the user's eyes. The instrument tracking module uses top and bottom digital cameras to track a marker on an upper portion of an instrument manipulated on a surgical phantom and to track a lower portion of the instrument. The simulation generation module can generate and display augmented reality images that merge the real stereo videos and virtual images for simulation of actions of the instrument in interaction with a training program executed in a processor of the simulation generation module. Accordingly, the augmented reality training system allows real instruments as the user interface, and establishes a reliable and generalized microscopic tracking framework.

19 Claims, 7 Drawing Sheets

(56) References Cited

U.S. PATENT DOCUMENTS

2017/0227754 A1* 8/2017 Huang ................ G09B 5/02
2019/0272800 A1* 9/2019 Tao .................... G09G 5/006

OTHER PUBLICATIONS

TASI "Video See-Through Augmented Reality Stereo Microscope with Customized Interpupillary Distance Design" Nov. 2, 2015; 1077952576—1077952576, Nov. 2, 2015 (Nov. 2, 2015), p. 1, XP058077 450, DOI: 10.1145/2820926.2820960, ISBN: 978-1-4503-3926-1 (p. 1).

Huang et al., "CatAR: A Novel Steroscopic augmented Reality Cataract Surgery Training System with Dexterous Instrument Tracking Technology," CHI 2018, Apr. 21-26, 2018, 12 pages.

Huang et al., "A Novel Dexterous Instrument Tracking System for Augmented Reality Cataract Surgery Training System," Nov. 28, 2016, 2 pages.

Tsai et al., "A Modified Wheatstone-Style Head Mounted Display Prototype for Narrow Field-of-View Video See-Through Augmented Reality," Jul. 24, 2016, 2 pages.

Huang et al., "Scope+: A Steroscopic Video See-Through Augmented Reality Microscope," Nov. 2, 2015, 2 pages.

\* cited by examiner

AUGMENTED REALITY TRAINING SYSTEM

CROSS REFERENCE TO RELATED APPLICATION

This application claims the benefit of filing date of U.S. Provisional Application Ser. No. 62/661,511 filed on Apr. 23, 2018. The entirety of said Provisional application is incorporated herein by reference.

BACKGROUND OF THE INVENTION

1. Field of the Invention

The present invention relates to an augmented reality training system and, more particularly, to an augmented reality training system suitable for microsurgery training, such as eye surgery, neuro surgery, cardiovascular surgery and plastic surgery.

2. Description of Related Art

In 1995, Hunter and his colleagues invented the first ophthalmic virtual reality simulation system that utilized mechanical robotic arms to receive subtle motion inputs. Researchers have adopted other technologies such as electromagnetic sensors, optical tracking cameras, Hall effect sensors, inertial sensors, and hybrid systems to improve the accuracy and resolution of instrument localization. Specially designed, modified, or wired props instead of real instruments are required to interact with the sensors; the weights and tactile feedback patterns of these props differ from those of the real instruments.

In addition to the accuracy and resolution of an instrument's localization, familiarity with the required instruments is crucial for a cataract surgeon. For example, the capsule forceps may have curved or straight tips and a round or flat handle; each type requires different operation skills. Surgical techniques are highly related to the instrument type, especially in microsurgery, therefore the benefits of a training system will be limited if the real instruments are not accessible during practice. In a conventional optical tracking system, at least 3 reflection markers must be attached to the replicas for 6 degrees of freedom (DOF) tracking. The weight and elasticity of the replicas will differ from those of real instruments. In an electromagnetic system, the accuracy might be influenced by the metal material of real instruments. In a mechanical articulated system, users usually manipulate with small robotic arms instead of surgical instruments. These are the fundamental difficulties in utilizing real instruments in previous surgical training systems.

The works mentioned above are all built in virtual reality (VR). These systems track the instrument and then render the tool-eye interaction in a virtual environment, hence the real instruments cannot be observed. Furthermore, an eye model with a magnified scale is used, though it is unnoticed in a virtual environment, the movement will vary widely in real surgery.

SUMMARY OF THE INVENTION

An objective of the present invention is to provide an augmented reality (AR) training system which realizes subtle movement tracking and real instrument practice and improves trainees' hand-eye coordination.

In accordance with the foregoing objectives, the present invention provides an augmented reality training system (ARTS), comprising: a manipulation platform, having a model-placement area for placement of a surgical phantom and a workspace for permitting a user to perform manipulation training on the surgical phantom; an augmented reality stereo microscopic assembly, being disposed in relation to the manipulation platform and configured for camera-based capture of real stereo videos of the surgical phantom and an instrument to be manipulated on the surgical phantom and for transmission of augmented reality images into the user's eyes; an instrument tracking module, including at least one top digital camera and at least one bottom digital camera and being configured to provide position and orientation signals of the instrument, wherein the top digital camera is disposed above the workspace to track a marker at an upper portion of the instrument, and the bottom digital camera is disposed below the workspace to track a lower portion of the instrument; and a simulation generation module, being coupled to the augmented reality stereo microscopic assembly and the instrument tracking module and configured to generate and display the augmented reality images that merge the real stereo videos from the augmented reality stereo microscopic assembly and virtual images based on the position and orientation signals and a training program for simulation of actions of the instrument in interaction with the training program.

Accordingly, the augmented reality training system can be applied in microsurgery training, such as cataract surgery, neuro surgery, cardiovascular surgery, plastic surgery etc., to meet user requirements for using real surgical instruments instead of fake props. Through the top and bottom digital cameras, the positions of instruments can be calculated in real time and the corresponding virtual animations can be generated. The virtual images are overlaid on the real stereo videos captured by the microscope module, and finally users can view the AR results through binocular eyepieces. As the ARTS is designed according to the structures of the stereomicroscope and surgical microscope, it not only provides the ability to observe small objects with proper stereo vision, but also ultra-high resolution binocular tube display to accomplish the realistic user experience. In particular, the ARTS performs 0.02 mm in spatial accuracy, which is sufficient for surgeons to perform the cataract surgery. Under the ARTS, the users can make their own entrance wound freely. Besides, there are no limitations on the moving path, and the surgical field is also in the real scale without magnification.

In the present invention, the ARTS can track multiple kinds of instruments, such as spatulas, choppers, forceps and so forth. With special designed cameras settings and software algorithm, users can utilize their pre-registered instruments under the ARTS with 7 degree-of-freedom (DOF) tracking, including forceps' opening and closing. As real instruments can be used as the user interface in this system without any wire attached to, the improvements of their surgical skills could be transferred to real operations with a minimal transition period. Before the ARTS is used, one or more markers must be attached to the instrument. The marker may be a passive marker (such as a reflective ball) or an active marker (such as a LED module adapted to wireless or wired charging) configured to be attachable to the upper portion of the instrument. In a preferred embodiment, a passive marker is utilized as the marker, and the ARTS further includes a top light module above the workspace. In the aspect of using infrared (IR) cameras as the top and bottom cameras, the top light module is configured to provide infrared light and visible light. As a result, the upper portion of the instrument can be tracked through the marker. Additionally, the ARTS preferably further includes a bottom light module below the workspace to provide infrared light and visible light. More specifically, the bottom light module can include a plurality of light sources, so that users can judge the depth of the lower portion of the instrument with greater ease. Compared to the conventional optical based tracking system in which at least three reflection marker are required for 6-DOF tracking, the application of only one marker in the ARTS has advantages that users can ignore the difference after installing the marker and the immersion of the experience cannot be not affected.

In the present invention, the simulation generation module may include a processor and a monitor. The processor is coupled to the augmented reality stereo microscopic assembly and the instrument tracking module, and the monitor is coupled to the processor and configured to display the augmented reality images. More specifically, the monitor can include a right screen and a left screen, and the augmented reality images are displayed on the right and left screens and then transmitted into the user's eyes through an optical module of the augmented reality stereo microscopic assembly. Additionally, the simulation generation module may further include a tutor panel coupled to the processor and configured to display a three-dimensional view for visualizing a three-dimensional simulated model of the surgical phantom and a three-dimensional simulated image of the instrument in interaction with the training program. Preferably, the processor of the simulation generation module can provide an analysis report about the user's manipulation under the training program to the tutor panel for the user's view. For cataract surgery training, the virtual images generated by the processor includes a virtual pupil area, and the training program is executed in the processor to provide at least one of the following training courses: (i) at least one virtual object being set in the virtual pupil area for recording positions of the instrument manipulated by the user during the training course for a preset period and analyzing motion ranges of the instrument to evaluate the user's antitremor skill; (ii) a virtual starting point and virtual objects being set in the virtual pupil area for recording times and path the user takes to manipulate the instrument from touching the virtual starting point to touching the virtual objects at different heights to evaluate the user's depth sensing and navigation skill; (iii) a virtual reference circle being set in the virtual pupil area for comparing a virtual tracking curve drawn by the user with the virtual reference circle to evaluate the user's circular tracing skill; (iv) at least one virtual object and a virtual target point being set in the virtual pupil area for recording times for grabbing the virtual object and dragging the virtual object to the target point through a forceps manipulated by the user to evaluate the user's forceps handling skill; and (v) a virtual object, a virtual guidance curve and a virtual releasing point being set in the virtual pupil area for recording times for grasping the virtual object and bringing the virtual object to the virtual releasing point along the virtual guidance curve through a forceps manipulated by the user to evaluate the user's capsulorhexis skill.

In the present invention, the augmented reality stereo microscopic assembly can provide magnified stereo images, and may include a camera module, an optical module and an eyepiece module. The camera module is positioned in relation to the workspace to capture the real stereo videos, and the optical module is positioned with respect to the eyepiece module and the simulation generation module to transmit the augmented reality images into the user's eyes through the eyepiece module. More specifically, the optical module can include lenses, prisms, mirrors, diffusers and beam splitters. Accordingly, the augmented reality images can be transmitted into the user's eyes through the lenses, the prisms, the mirrors, the diffusers and the beam splitters.

In the present invention, the surgical phantom may include an eye model for cataract surgery training Preferably, the eye model has an artificial wound configured for permitting the instrument to be inserted into the eye model through the artificial wound. More specifically, the eye model may have a rigid bottom and a soft part on the rigid bottom, and the artificial wound is formed in the soft part. Accordingly, the frictional force between the soft part of the eye model and the instrument can provide realistic haptic feedback. Further, the training program can be executed in the processor to set warning indicators on edges of the artificial wound for indicating a warning when a collision with the instrument is detected.

In the present invention, the augmented reality training system may further include an operable interface module coupled to the processor and configured to allow the user's operation for adjusting a focal plane or a ratio to zoom-in/-out of the augmented reality stereo microscopic assembly or for moving the augmented reality stereo microscopic assembly. Additionally, the operable interface module can further allow the user to adjust light and control other customized function.

The foregoing and other objects, advantages, and novel features of the invention will become more apparent from the following detailed description when taken in conjunction with the accompanying drawings.

DETAILED DESCRIPTION OF THE PREFERRED EMBODIMENT

Hereafter, example will be provided to illustrate the embodiments of the present invention. Advantages and effects of the invention will become more apparent from the disclosure of the present invention. It should be noted that these accompanying figures are simplified and illustrative. The quantity, shape and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Figure 1:
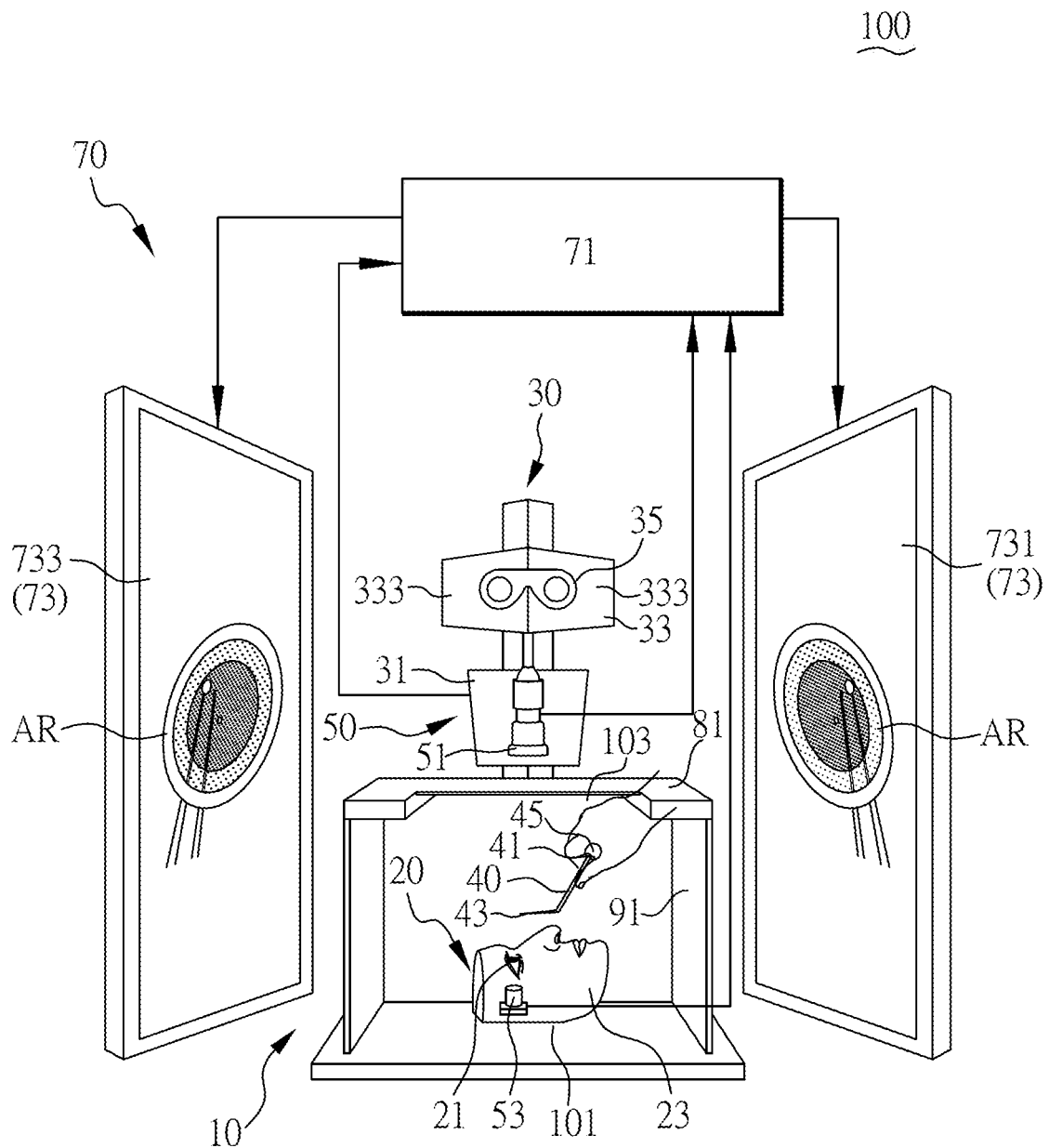
FIG. 1 is a schematic view of an augmented reality training system in accordance with one embodiment of the present invention.

Please refer to FIG. 1, which is a schematic view of an augmented reality training system (ARTS) 100 in accordance with one embodiment of the present invention. The augmented reality training system 100 of this embodiment mainly includes a manipulation platform 10, an augmented reality stereo microscopic assembly 30, an instrument tracking module 50 and a simulation generation module 70. In the augmented reality training system 100, the simulation generation module 70 can receive signals from the augmented reality stereo microscopic assembly 30 and the instrument tracking module 50 and generate and display augmented reality images AR on its monitor 73, so that the user can view the augmented reality images AR reflected from the monitor 73 into the user's eyes through the augmented reality stereo microscopic assembly 30.

For exemplary description, the augmented reality training system 100 is illustrated for eye surgery training (such as cataract surgery training), and thus a schematic eye model is employed in this embodiment for exemplary illustration of the surgical phantom 20. However, it should be understood that the augmented reality training system 100 is not restricted to eye surgery training, and any manipulation training can be conducted by the augmented reality training system 100. The detailed structure of the augmented reality training system 100 and the association among main components in accordance with the present invention are further illustrated as follows.

The manipulation platform 10 has a model-placement area 101 for placement of the surgical phantom 20 and a workspace 103 for permitting a user's hands to perform manipulation training (such as surgical training) on the surgical phantom 20. In this embodiment, the manipulation platform 10 is covered by a box to prevent unwanted ambient light. Additionally, the interior of the box is covered by black non-reflective material to eliminate secondary reflection.

Figure 2:
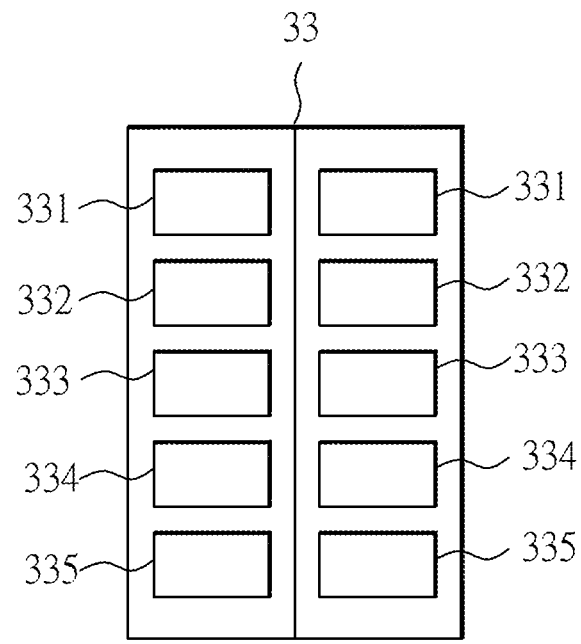
FIG. 2 is a block diagram of an optical module in accordance with one embodiment of the present invention.

The augmented reality stereo microscopic assembly 30 is disposed in relation to the manipulation platform 10 (more specifically, above the workspace 103 of the manipulation platform 10) and configured for camera-based capture of real stereo videos of the surgical phantom 20 and an instrument 40 (such as a surgical instrument) to be manipulated on the surgical phantom 20 and for optical transmission of augmented reality images AR into the user's eyes. More specifically, the augmented reality stereo microscopic assembly 30 can include a camera module 31, an optical module 33 and an eyepiece module 35. The camera module 31 is positioned in relation to the workspace 103 to capture images of real scenes. In this embodiment, the camera module 31 is equipped with dual stereo cameras set at a suitable distance to provide the real stereo videos. The distance and angle between dual stereo cameras are adjustable to fit different working distance. The optical module 33 is positioned with respect to the eyepiece module 35 for transmission of the augmented reality images AR displayed on the monitor 73 toward the eyepiece module 35. In this embodiment, the optical module 33 includes dual mirrors 333, of which the right and left ones are disposed in relation to the right and left halves of the eyepiece module 35, respectively. In addition to the mirrors 333, as shown in FIG. 2, the optical module 33 typically further includes lenses 331, prisms 332, diffusers 334 and beam splitters 335, so that the augmented reality images AR are reflected from the monitor 73 into the user's eyes through the lenses 331, the prisms 332, the mirrors 333, the diffusers 334 and the beam splitters 335.

Figure 3:
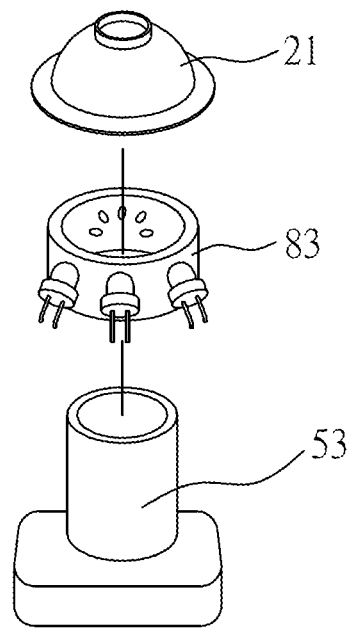
FIG. 3 is an exploded perspective view of an assembly of a bottom digital camera, a bottom light module and an eye model in accordance with one embodiment of the present invention.
Figure 4:
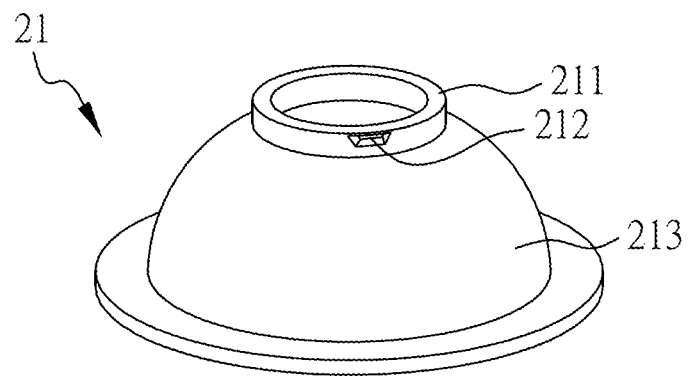
FIG. 4 is a perspective view of an eye model in accordance with one embodiment of the present invention.

The instrument tracking module 50 includes a top digital camera 51 and a bottom digital camera 53 and is configured to provide position and orientation signals of the instrument 40. The top digital camera 51 and the bottom digital camera 53 may be infrared cameras, RGB cameras, depth cameras, thermal cameras and so forth, but are not limited thereto. In this embodiment, infrared cameras are employed for exemplary illustration of the top and bottom digital cameras 51, 53. The top digital camera 51 is disposed above the workspace 103 and configured to track the upper portion 41 (such as a tail) of the instrument 40. The bottom digital camera 53 is disposed below the workspace 103 and configured to track the lower portion 43 (such as a head) of the instrument 40. For instance, in the eye surgery training, the bottom digital camera 53 is rotatably disposed, for example, underneath a hollow eye model 21, as shown in FIG. 3, and both the top and bottom digital cameras 51, 53 focus at any location within the surgical field of the surgical phantom 20 (such as the pupil of the hollow eye model 21, which is 10 mm in diameter). More specifically, the top digital camera 51 is configured to track a marker 45 attached to the upper portion 41 of the instrument 40, whereas the bottom digital camera 53 is configured to retrieve feature of the lower position 43 of the instrument 40. The marker 45 is adapted to be attachable on the upper portion 41 of the instrument 40, and may be any passive marker or active marker. In this embodiment, a passive marker is utilized as the marker 45, and a top light module 81 is disposed above the workspace 103 to provide infrared light and visible light (such as white light). For instance, the marker 45 may be a tiny reflective ball, which is a plastic ball covered by 3M™ Scotchlite™ reflective tape to generate a uniform reflection regardless of the direction of the light source. With 6 mm in diameter and around 0.8 gram in weight, users can ignore the difference after installing the marker, and users' performances are not affected. In real surgery, the retina reflects the light from the microscope to illuminate the lower portion 43 of the instrument 40. To imitate this phenomenon, as shown in FIG. 3, a bottom light module 83, which includes, for example, four adjustable light sources (such as infrared & white LEDs), is attached on the bottom of the eye model 21 in this embodiment to help users judge the depth of the lower portion 43 with greater ease. When using forceps having a symmetrical structure as the instrument 40 for surgery, at least one of the proximal ends makes contact with the wound bottom during manipulation. This feature can be distinguished by utilizing the luminance difference of images from the bottom digital camera 53. Once the contacted part is recognized, the position and the opening angle of the instrument 40 can be calculated using algorithms According to premeasured information detected by the top and bottom digital cameras 51, 53, the lengths between its tip, reflective ball, and its turning point can be determined, and the 3D position and orientation of the instrument 40 can be calculated. Further, in order to minimize the interference from variant colors and reflected light, it is suggested to wear black latex gloves while operating the instrument. In this embodiment, the surgical phantom 20 further includes a realistic mannequin 23 combined with the eye model 21 so that the requirements of physical feedback in cataract surgery training can be met. To provide a more immersive environment and passive haptic feedback, the realistic mannequin 23 may be modified from a three-dimensional (3D) scanned human model with a prominent orbital rim and a frontal bone in its actual dimensions. As for the eye model 21, please referring to FIG. 4, a soft part 211 is formed on a rigid bottom 213 to provide a more immersive environment and passive haptic feedback. In this embodiment, a 0.2 mm nozzle with an ethylene vinyl acetate (EVA) filament is utilized to print the soft part 211 as a delicate elastic cornea part on top of the rigid bottom 213. Further, an artificial wound 212 is formed in the soft part 211 to represent a cornea wound. Accordingly, the lower portion 43 of the instrument 40 can be inserted into the eye model 21 through the artificial wound 212, and the frictional force between the soft part 211 of the eye model 21 and the instrument 40 can provide realistic haptic feedback. In this embodiment, the width of the artificial wound 212 is 2.4 mm, identical to the standard cornea incision in microincision cataract surgery. The height of the artificial wound 212 is adjusted iteratively and checked by expert surgeons to obtain realistic deformation properties to constrain the forceps opening while tilting laterally.

In another embodiment, the augmented reality training system 100 further comprises a wireless power transmission module 91 (as shown in FIG. 1) which is disposed adjacent to the manipulation platform 10 to create an inductive field in the workspace 103. Thus, any wireless chargeable electronic device (for example, the instrument 40, the eye model 21, the lower camera 53, an active LED marker, or any optical/electrical component may be designed as a wireless chargeable device) disposed in the workspace 103 would be charged wirelessly.

Figure 5:
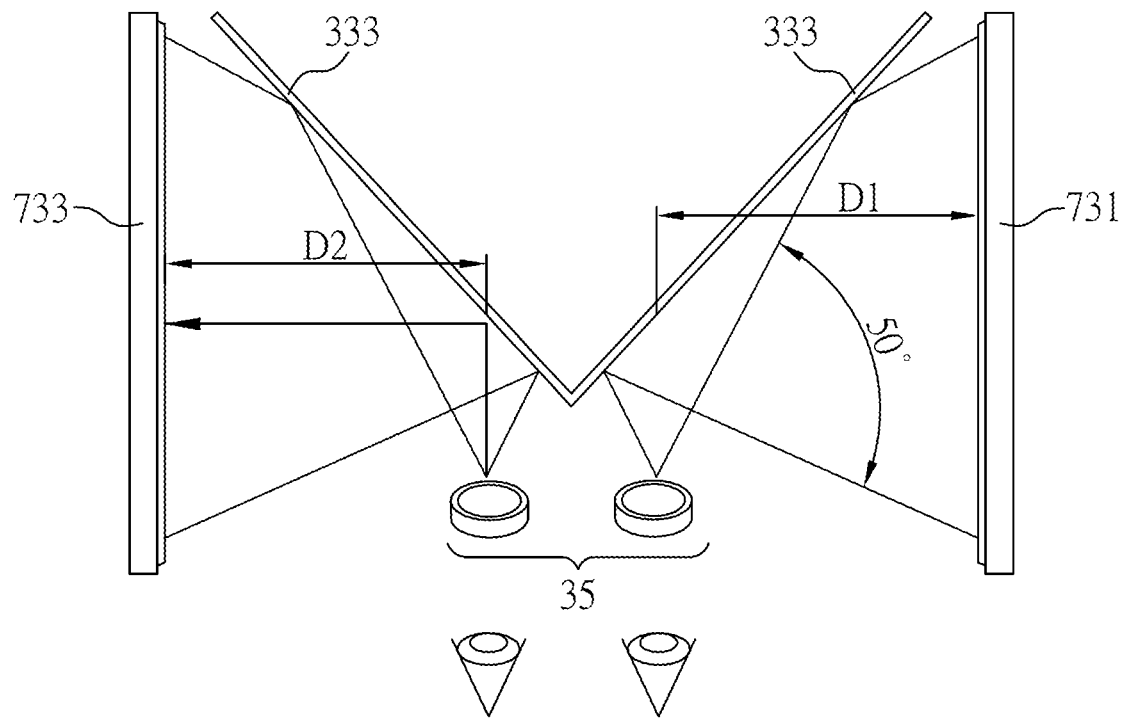
FIG. 5 is a schematic view of the arrangement of a mirror module, a monitor and an eyepiece module in accordance with one embodiment of the present invention.
Figure 6:
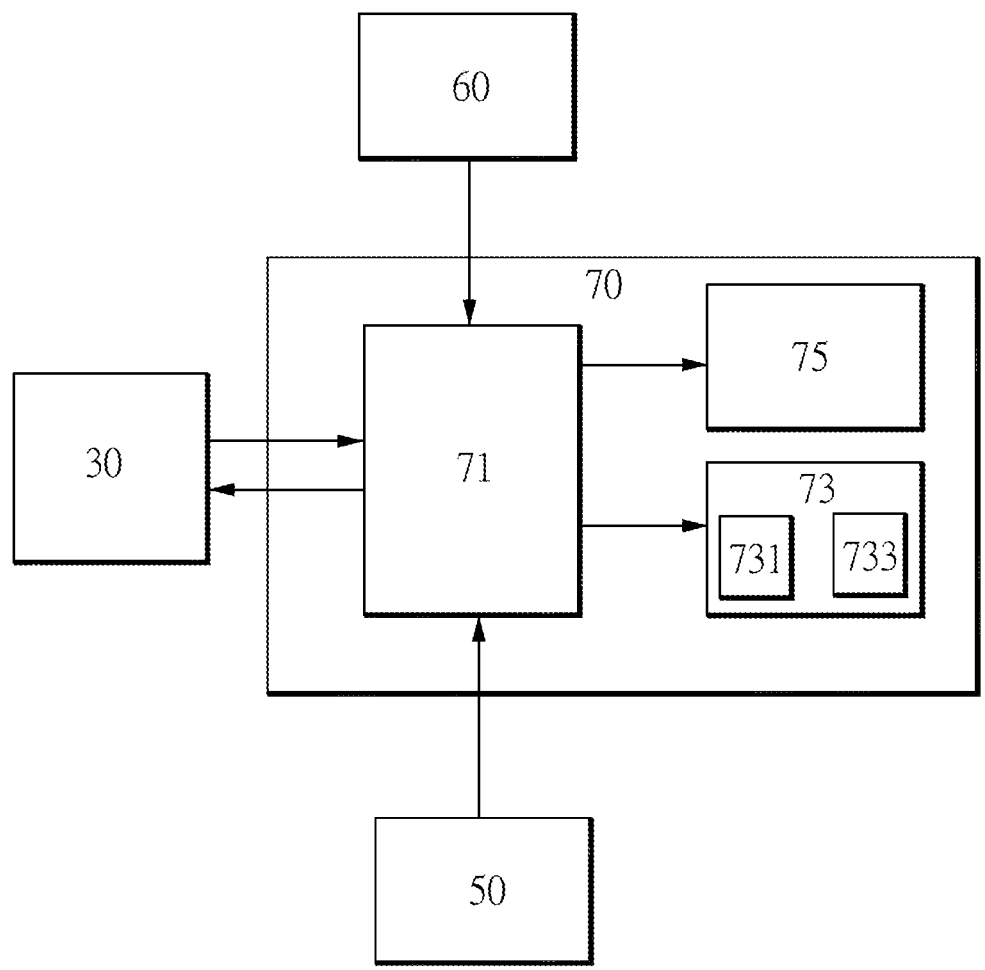
FIG. 6 is a block diagram for illustrating signal transduction among an augmented reality stereo microscopic assembly, an instrument tracking module, an operable interface module and an instrument tracking module in accordance with one embodiment of the present invention.

The simulation generation module 70 is coupled to the augmented reality stereo microscopic assembly 30 and the instrument tracking module 50 and is configured to generate and display augmented reality images AR that merge the real stereo videos from the augmented reality stereo microscopic assembly 30 and virtual images based on the position and orientation signals and a training program for simulation of actions of the instrument 40 in interaction with the training program. More specifically, the simulation generation module 70 can include a processor 71 coupled to the augmented reality stereo microscopic assembly 30 and the instrument tracking module 50 and a monitor 73 coupled to the processor 71 and configured to display the augmented reality images AR. The monitor 73 is positioned with respect to the optical module 33, so that the augmented reality images AR displayed on the monitor 73 can be transmitted by the optical module 33 into the user's eyes through the eyepiece module 35. More specifically, the monitor 73 can include a right screen 731 and a left screen 733 positioned with respect to and facing the optical module 33 (for example, facing the right and left mirrors 333, respectively). Accordingly, the right augmented reality image AR displayed on the right screen 731 is projected into the user's right eye by the right part of the optical module 33 (for example, the right mirror 333), whereas the left augmented reality image AR displayed on the left screen 733 is projected into the user's left eye by the left part of the optical module 33 (for example, the left mirror 333). In this embodiment, video see-through (VST) technologies are adopted in the system, and the user looks into displays that provide precomposed real and virtual images. As the latency of real and virtual images is always identical and will not cause misalignment in VST systems, the visual results are more comfortable to view in a VST system and usually acceptable if the latency is below 33 ms. In order to achieve acceptable resolution for microsurgery simulation, it is preferred to employ high-resolution panels in any size as image sources, such as dual 28-inch 4K LCD panels, to display the augmented reality images AR. In this embodiment, as shown in FIG. 5, the horizontal distances D1 and D2 between the right mirror 333 and the right screen 731 and between the left mirror 333 and the left screen 733 are set at 32 cm, respectively, to provide high pixels per degree (PPD) images (43 PPD) with a 50-degree viewing angle, which provides a realistic visual environment for microsurgery training Additionally, as shown in FIG. 6, the simulation generation module 70 may further include a tutor panel 75 coupled to the processor 71 and configured to display a three-dimensional view for visualizing a three-dimensional simulated model of the surgical phantom 20 and a three-dimensional simulated image of the instrument 40 in interaction with the training program. Preferably, the processor 71 provides an analysis report about the user's manipulation under the training program to the tutor panel 75 for the user's view. Moreover, in actual application, as shown in FIG. 6, an operable interface module 60 may be further coupled to the processor 71 and configured to allow the user's operation for adjusting, for example, a focal plane, a zoom-in ratio or a zoom-out ratio of the augmented reality stereo microscopic assembly 30, for moving the augmented reality stereo microscopic assembly 30, for adjusting light or for controlling other customized function. Specifically, the operable interface module 60 may be a foot pedal or any mechanism operable by the user to adjust the required conditions. Upon the processor 71 receives instructions from the operable interface module 60 under the user's operation, corresponding control signals are generated by the processor 71 and issued to the augmented reality stereo microscopic assembly 30. In this embodiment, the augmented reality training system 100 is exemplified for cataract surgery training, and thus the training program executed in the processor 71 sets warning indicators and provides four abstract training courses (antitremor, anterior chamber navigation, circular tracing, and forceps training) and 1 procedural training course (capsulorhexis) as follows.

[Wound Touch Detection]

The cornea structure can be irreversibly damaged if a surgeon manipulates instruments forcefully on the edges of the cornea wound. These complications can be avoided if surgeons utilize the pivot concept. However, it is difficult to take care of the wound condition while the trainees are intensively focused on the instrument tip. In the augmented reality training system 100, as shown in FIGS. 7-11, the warning indicators $W_1$, $W_2$ are set on the right and left edges of the artificial wound and will change their color if a collision with the instrument 40 is detected. The measurements of wound touch, total wound touch time, and maximum wound touch time are recorded and analyzed in all but the antitremor modes.

[Antitremor Mode]

Figure 7:
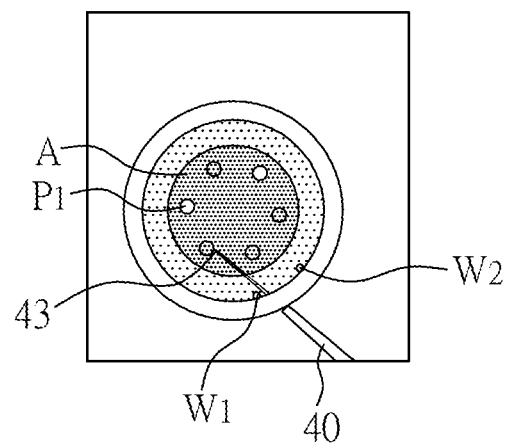
FIG. 7 is a schematic view of an augmented reality image under antitremor mode in accordance with one embodiment of the present invention.

As shown in FIG. 7, six virtual objects $P_1$ (illustrated as six balls) are distributed in the virtual pupil area A with the same height evenly along, for example, the margin of the virtual pupil area A. The virtual objects $P_1$ will change their color when contacted by the lower portion 43 of the instrument 40 (illustrated as a spatula) and will disappear after continuous touching for a preset period, such as 5 seconds. The user can touch the virtual objects $P_1$ in arbitrary order and the tip position will be recorded 5 times per second while the lower portion 43 is touching the virtual object $P_1$. The motion ranges in the X, Y, and Z axes and the cubic space of motion are calculated and analyzed so as to evaluate the user's antitremor skill.

[Anterior Chamber Navigation Mode]

Figure 8:
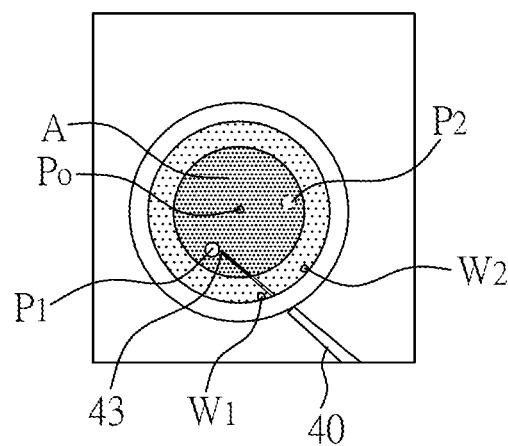
FIG. 8 is a schematic view of an augmented reality image under anterior chamber navigation mode in accordance with one embodiment of the present invention.

As shown in FIG. 8, a virtual starting point $P_o$ is set at the center in virtual pupil area A, and virtual objects $P_1, P_2 \ldots P_n$ (p.s. only $P_1$ and $P_2$ are shown in the figure for illustration) are set in at different heights and locations in the virtual pupil area A. The user has to touch the virtual starting point $P_o$ first and one randomly selected virtual object $P_1$ will appear after that. After the virtual object $P_1$ has been touched and has disappeared, the virtual starting point $P_o$ will show up again. The user has to move back to the virtual starting point $P_o$ and then move on the next random virtual object $P_2$ until a preset amount (such as twelve) of virtual objects $P_1, P_2 \ldots P_n$ have all been touched. The time the user takes to manipulate the lower portion 43 of the instrument 40 (illustrated as a spatula) from the virtual starting point $P_o$ to the next virtual object $P_1, P_2 \ldots P_n$ is defined as the search time. The total and maximum search time and total task time are recorded and analyzed so as to evaluate the user's depth sensing and navigation skill.

[Circular Tracing Mode]

Figure 9:
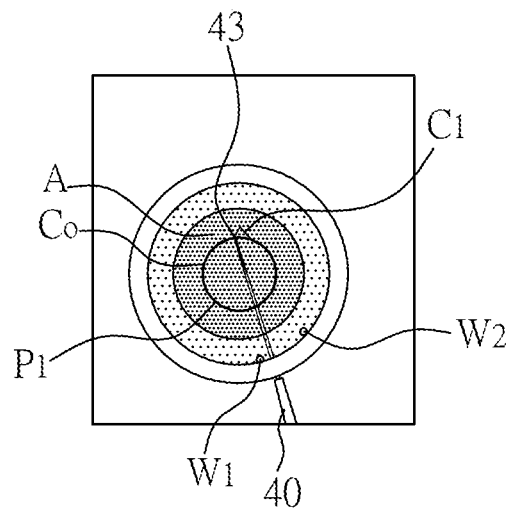
FIG. 9 is a schematic view of an augmented reality image under circular tracing mode in accordance with one embodiment of the present invention.

As shown in FIG. 9, a virtual reference circle $C_o$ is defined at the center of the virtual pupil area A to represent the capsulorhexis area. The user has to trace this virtual reference circle $C_o$ with the lower portion 43 of the instrument 40 (illustrated as a spatula) starting from the side opposite to the wound. This task can be performed in a clockwise or counterclockwise direction based on the user's preference. For each sampling point on the virtual tracing curve $C_1$ drawn by the user, a corresponding point can be determined with the same central angle on the virtual reference circle $C_o$. The average distance of each point's pair is calculated. The Frechet distance and the lengths difference between the virtual tracing curve $C_1$ and virtual reference circle $C_o$ are also calculated. The task time is recorded and normalized according to the central angle. Accordingly, the user's circular tracing skill can be evaluated.

[Forceps Training Mode]

Figure 10:
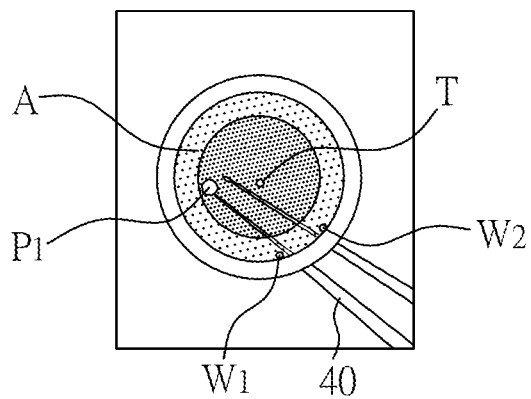
FIG. 10 is a schematic view of an augmented reality image under forceps training mode in accordance with one embodiment of the present invention.

As shown in FIG. 10, a preset amount (such as six) of virtual objects $P_1$ at the same positions (p.s. only one virtual object $P_1$ is shown in the figure because other virtual objects will not appear until the first manipulation on the virtual object $P_1$ is completed) and a virtual target point T at a different position from the virtual objects $P_1$ are set in the virtual pupil area A. The user has to grasp one virtual object $P_1$ with the instrument 40 (illustrated as capsule forceps) first, and then bring it carefully to the virtual target point T to make it disappear. The virtual objects $P_1$ are approached in counterclockwise order. The time the user takes to grasp the next virtual object $P_1$ is defined as the search time, and the time required to bring the virtual object $P_1$ to the virtual target point T is defined as the grab time. All the moving path lengths are accumulated as the value of the odometer. Accordingly, the user's forceps handling skill can be evaluated.

[Capsulorhexis Mode]

Figure 11:
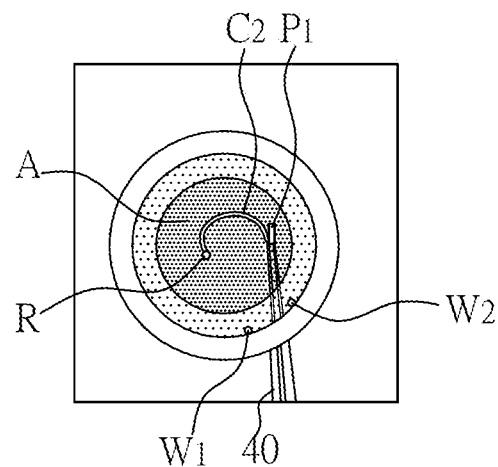
FIG. 11 is a schematic view of an augmented reality image under capsulorhexis mode in accordance with one embodiment of the present invention.

As shown in FIG. 11, after an initial flap has been created on the anterior capsule, the surgeon should grasp the proximal end of the flap using capsule forceps, and drag it to create a round tear. The flap should be released after a quarter tear has been completed, and the surgeon must move the forceps tips to the new proximal end. These steps are repeated until a continuous circular capsulorhexis has been completed. In this mode, a virtual object $P_1$ (illustrated as a thin box), a virtual guidance curve $C_2$ and a virtual releasing point R are set in the virtual pupil area A. The virtual object $P_1$ (illustrated as a thin box) is placed on the ideal capsulorhexis margin representing the proximal end of the flap. The user has to grasp the virtual object $P_1$ and drag it along the virtual guidance curve $C_2$ to the virtual releasing point R. This task should be repeated in 4 quarter directions to practice the movements in a standard capsulorhexis. The time the user requires to grasp the virtual object $P_1$ is defined as the search time and the time required to bring it to the virtual releasing point T is defined as grab time. All the moving path lengths are accumulated as the values of the odometer. Accordingly, the user's capsulorhexis skill can be evaluated.

[Participants]

From March to April 2017, 28 participants consisting of 1 ophthalmic surgical physician assistant, 1 intern and 2 postgraduate year 1 residents in an ophthalmology training course, 18 ophthalmology residents and 6 cataract surgeons were included in this study. Participants were divided into 3 groups according to their levels of training: (1) Novices, the group of trainees who were in or before their second year of residency. All of them had experience in watching or assisting cataract surgery but only a few had limited experience in performing surgical steps on humans. (2) Intermediate trainees, defined as residents who had performed steps of cataract surgical procedures under supervision regularly but had yet to operate independently (zero independent operations at time of enrollment in the study). (3) Experienced surgeons were those able to complete cataract surgery independently.

[Intervention]

All the participants were first instructed in a standardized manner on the function and operation methods of the augmented reality training system 100 (5 mins). After adequately adjusting the interpupillary distance, one short warm-up section (5 mins) followed to familiarize them with the augmented reality training system 100. The pre-intervention section was started after that, and 5 training modes were required to be completed once in the following sequence: Antitremor training, anterior chamber navigation, circular tracing training, forceps training, and capsulorhexis training. The results were recorded and their performances were monitored by one single senior instructor.

The practice section followed, consisting of 5 iterations of the antitremor and anterior chamber navigation modules and 10 iterations of the other 3 modes. Approximately 1 hour was required to practice these modes, and participants could ask for short breaks if needed. All modes were performed once again in the same order in the post-intervention section after practice. The results were recorded and compared with the corresponding results in the pre-intervention section, as shown in following Table 1.

TABLE 1

| | Pre-intervention n = 28 | | Post-intervention n = 28 | | |
|---|---|---|---|---|---|
| | Mean | SD | Mean | SD | p-value‡ |
| Antitremor Mode | | | | | |
| Motion range in X (mm) | 1.08 | 0.76 | 0.81 | 0.22 | 0.2275 |
| Motion range in Y (mm) | 0.41 | 0.21 | 0.70 | 0.20 | 0.0088* |
| Motion range in Z (mm) | 1.06 | 0.87 | 0.32 | 0.19 | 0.0242* |
| Cubic space of motion ($mm^3$) | 0.82 | 1.46 | 0.18 | 0.14 | 0.0067* |
| Anterior Chamber Navigation Mode | | | | | |
| Total task time (sec) | 99.43 | 28.44 | 72.90 | 12.03 | <0.0001* |
| Search time (sec) | 66.72 | 23.85 | 45.70 | 9.90 | <0.0001* |
| Max search time (sec) | 15.14 | 12.69 | 7.35 | 2.41 | 0.0001* |
| Wound touch (n) | 9.50 | 6.17 | 4.69 | 4.13 | 0.0016* |
| Wound touch Time (sec) | 9.05 | 11.92 | 1.83 | 1.81 | 0.0013* |
| Max wound touch Time (sec) | 3.20 | 4.55 | 0.66 | 0.55 | 0.0003* |
| Circular Tracing Mode | | | | | |
| Normalized task time (sec) | 18.22 | 6.52 | 13.66 | 3.98 | 0.0004* |
| Difference of travel path (%) | 0.54 | 0.66 | 0.20 | 0.14 | 0.0001* |
| Average distance diff. (mm) | 0.80 | 0.59 | 0.50 | 0.39 | <0.0001* |
| Frechet distance (mm) | 1.71 | 2.14 | 0.84 | 0.28 | <0.0001* |
| Wound touch (n) | 3.04 | 2.29 | 1.88 | 1.34 | 0.0266* |
| Wound touch Time (sec) | 4.13 | 2.72 | 2.01 | 1.78 | 0.0024* |
| Max wound touch Time (sec) | 3.04 | 2.32 | 1.30 | 1.04 | 0.0018* |
| Forceps Training Mode | | | | | |
| Search time (sec) | 61.69 | 54.17 | 26.76 | 13.67 | <0.0001* |
| Grab time (sec) | 24.45 | 17.48 | 11.69 | 6.98 | 0.0001* |
| Total task time (sec) | 84.42 | 67.35 | 38.78 | 19.97 | <0.0001* |
| Odometer (mm) | 212.77 | 163.38 | 121.42 | 75.19 | <0.0001* |
| Wound touch (n) | 22.85 | 21.72 | 12.07 | 10.62 | 0.0002* |
| Wound touch Time (sec) | 18.53 | 20.15 | 7.69 | 8.52 | 0.0001* |
| Max wound touch Time (sec) | 2.32 | 1.56 | 26.76 | 13.67 | <0.0001* |
| Capsulorhexis Mode | | | | | |
| Search time (sec) | 14.10 | 6.10 | 11.90 | 6.57 | 0.0325* |
| Grab time (sec) | 31.88 | 19.91 | 19.49 | 8.13 | 0.0001* |
| Total task time (sec) | 45.98 | 23.01 | 31.38 | 13.32 | <0.0001* |
| Odometer (mm) | 127.29 | 43.59 | 100.88 | 34.75 | <0.0001* |
| Wound touch (n) | 13.48 | 6.92 | 8.48 | 5.25 | 0.0004* |
| Wound touch Time (sec) | 12.58 | 8.88 | 7.26 | 6.43 | 0.0003* |
| Max wound touch Time (sec) | 2.62 | 1.99 | 1.62 | 0.85 | 0.0012* |

‡Wilcoxon Signed-Rank test
*Statistical significance

[Validation of the ARTS System]

A beneficial training system must have the ability to discriminate different skill levels by its scoring parameters. In this study, a construct validity analysis of all 5 modes proposed in the augmented reality training system 100 was conducted by comparing the pre-intervention results of the novice group (n=12) with the experienced surgeon group (n=9). The results were recorded, as shown in following Table 2.

Unlike other participants, 2 of the attending physicians had performed cornea incision from the superior side of a patient's head (superior approach) for many years. When they practiced on the mannequin designed for a temporal approach in this study, their hands' supporting postures and manipulation techniques through different directions of the cornea wound severely affected their baseline performance. Therefore, they were excluded from the experienced surgeon group in the construct validity analysis.

TABLE 2

| | Novice Baseline n = 12 | Experienced Surgeon Baseline n = 9¶ | |
|---|---|---|---|
| | Median | Median | p-value† |
| Antitremor Mode | | | |
| Motion range in X (mm) | 0.82 | 0.64 | 0.1179 |
| Motion range in Y (mm) | 0.88 | 0.68 | 0.0466* |
| Motion range in Z (mm) | 0.36 | 0.29 | 0.8870 |
| Cubic space of motion ($mm^3$) | 0.25 | 0.11 | 0.1769 |
| Anterior Chamber Navigation Mode | | | |
| Total task time (sec) | 107.42 | 78.04 | 0.0157* |
| Search time (sec) | 73.93 | 49.24 | 0.0157* |
| Max search time (sec) | 13.90 | 9.22 | 0.0646 |

TABLE 2-continued

| | Novice Baseline n = 12 | Experienced Surgeon Baseline n = 9¶ | |
| --- | --- | --- | --- |
| | Median | Median | p-value† |
| Wound touch (n) | 13.50 | 7.00 | 0.2196 |
| Wound touch Time (sec) | 7.44 | 2.78 | 0.3525 |
| Max wound touch Time (sec) | 2.25 | 0.94 | 0.8658 |
| Circular Tracing Mode | | | |
| Normalized task time (sec) | 15.11 | 19.09 | 0.2679 |
| Difference of travel path (%) | 0.40 | 0.23 | 0.0489* |
| Average distance diff. (mm) | 0.64 | 0.45 | 0.0423* |
| Frechet distance (mm) | 1.17 | 0.90 | 0.0097* |
| Wound touch (n) | 2.00 | 2.00 | 0.8262 |
| Wound touch Time (sec) | 4.73 | 3.58 | 0.7762 |
| Max wound touch Time (sec) | 2.74 | 3.30 | 0.8870 |
| Forceps Training Mode | | | |
| Search time (sec) | 69.34 | 31.16 | 0.0425* |
| Grab time (sec) | 27.74 | 11.84 | 0.0190* |
| Total task time (sec) | 105.05 | 45.42 | 0.0180* |
| Odometer (mm) | 234.20 | 100.88 | 0.0190* |
| Wound touch (n) | 26.50 | 11.00 | 0.0892 |
| Wound touch Time (sec) | 20.66 | 4.91 | 0.0372* |
| Max wound touch Time (sec) | 2.61 | 1.27 | 0.1052 |
| Capsulorhexis Mode | | | |
| Search time (sec) | 11.66 | 9.68 | 0.1356 |
| Grab time (sec) | 27.85 | 18.78 | 0.0466* |
| Total task time (sec) | 41.45 | 27.88 | 0.0230* |
| Odometer (mm) | 128.41 | 93.55 | 0.0011* |
| Wound touch (n) | 14.50 | 7.00 | 0.0549 |
| Wound touch Time (sec) | 13.86 | 7.80 | 0.0466* |
| Max wound touch Time (sec) | 2.80 | 1.76 | 0.0393* |

†Mann-Whitney U test
*Statistical significance
¶Two attending physicians are excluded Result

[Statistical Analysis]

Figure 12:
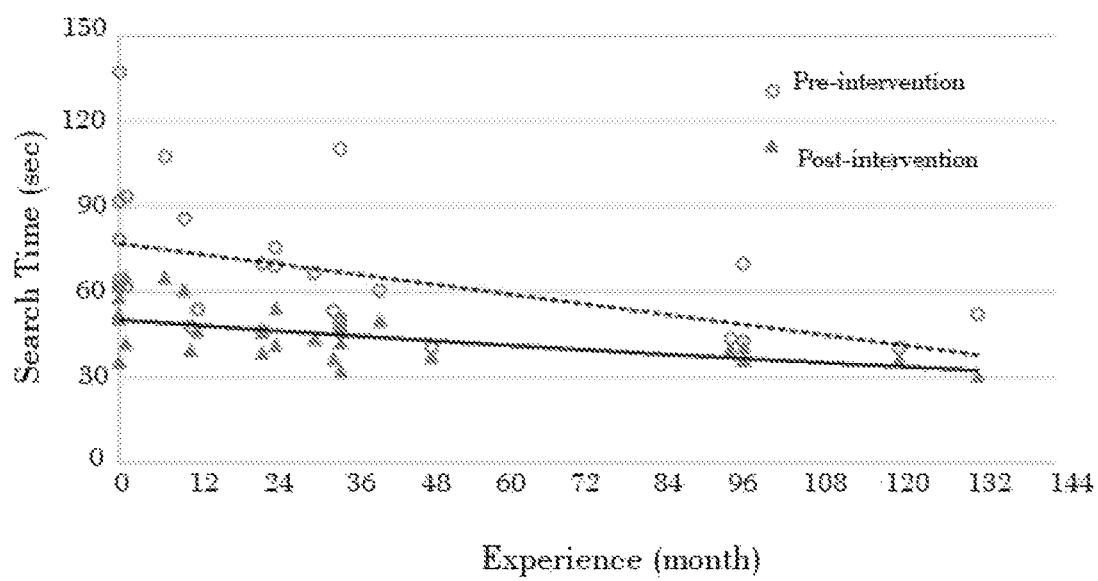
FIG. 12 is a correlation diagram between experience and search time in the anterior chamber navigation mode.

MedCalc software version 17.5.5 (MedCalc software BVBA, Ostend, Belgium) was employed for the statistical analysis. Differences in performance parameters between groups and in the subjective efficacy evaluation between training methods were tested for statistical significance using a two-tailed Mann-Whitney U test. Pre- and post-intervention performances were compared using the two-tailed Wilcoxon signed-rank test set at a significance level of 0.05. The Spearman's rank correlation coefficient was calculated to analyze the relationship between surgical experience (month) and hand-eye coordination ability, quantified by search time in the anterior chamber navigation module, as shown in FIG. 12.

[Construct Validity Analysis]

The experienced surgeons significantly outperformed novices by at least one parameter in all training modules, as shown in above Tables 1 and 2: motion range in Y direction ($P=0.047$) in the antitremor module; total task time ($P=0.016$) and search time ($P=0.016$) in the anterior chamber navigation module; difference of travel path ($P=0.049$), average distance difference ($P=0.042$) and Frechet distance ($P=0.010$) in the circular tracing module; search time ($P=0.043$), grab time ($P=0.019$), total task time ($P=0.018$), odometer ($P=0.019$) and wound touch time ($P=0.037$) in the forceps training module; grab time ($P=0.047$), total task time ($P=0.023$), odometer ($P=0.001$) wound touch time ($P=0.047$) and maximum wound touch time ($P=0.039$) in the capsulorhexis module. Sixteen out of the 31 parameters successfully passed the construct validity test.

[Objective Efficacy Analysis]

Participants gained statistically significant improvements ($P<0.05$) after a 1-hour intervention in all parameters except motion range in the X direction in the antitremor module ($P=0.2275$), as shown in above Tables 1 and 2. Furthermore, the differences were highly significant ($P<0.01$) in most of the parameters (27/31) except the motion range in the Z direction in the antitremor module ($P=0.024$), quantity of wound touch in the circular tracing module ($P=0.027$) and search time in the capsulorhexis module ($P=0.032$).

The ARTS according to the present invention is the first AR microsurgery simulator and also the first system using real instruments as the user interface. This system not only provides high spatial resolution stereoscopic AR images, but also tracks the surgical instruments with ultra-high accuracy (20 μm) in real time. The ARTS can discriminate surgical performance between different experience levels and can become a new assessment tool for surgical proficiency. The 3D motions during practice are recorded, and could be crucial training data sets for AI surgery in the future.

The above examples are intended for illustrating the embodiments of the subject invention and the technical features thereof, but not for restricting the scope of protection of the subject invention. Many other possible modifications and variations can be made without departing from the spirit and scope of the invention as hereinafter claimed. The scope of the subject invention is based on the claims as appended.

What is claimed is:

1. An augmented reality training system, comprising:
    a manipulation platform, having a model-placement area for placement of a surgical phantom and a workspace for permitting a user to perform manipulation training on the surgical phantom;
    an augmented reality stereo microscopic assembly, being disposed in relation to the manipulation platform and configured for camera-based capture of real stereo videos of the surgical phantom and an instrument to be manipulated on the surgical phantom and for transmission of augmented reality images into the user's eyes;
    an instrument tracking module, including at least one top digital camera and at least one bottom digital camera and being configured to provide three-dimensional position and orientation signals of the instrument, wherein the top digital camera is disposed above the workspace to track a marker at an upper portion of the instrument, and the bottom digital camera is disposed below the workspace to track a lower portion of the instrument; and
    a simulation generation module, including a processor being coupled to the augmented reality stereo microscopic assembly and the instrument tracking module and configured to generate and display the augmented reality images that merge the real stereo videos from the augmented reality stereo microscopic assembly and virtual images based on the three-dimensional position and orientation signals and a training program for simulation of actions of the instrument in interaction with the training program;
    wherein the virtual images include a virtual pupil area and at least one virtual object which are generated based on the training program, the at least one virtual object is in interaction with the instrument, and the processor records a result, which includes the three-dimensional position and orientation signals of the instrument and the virtual images, in the training program for evaluating the user's skill.

2. The augmented reality training system of claim 1, wherein the simulation generation module includes a monitor coupled to the processor and configured to display the augmented reality images.

3. The augmented reality training system of claim 2, wherein the simulation generation module further includes a tutor panel coupled to the processor and configured to display a three-dimensional view for visualizing a three-dimensional simulated model of the surgical phantom and a three-dimensional simulated image of the instrument in interaction with the training program.

4. The augmented reality training system of claim 3, wherein the processor provides an analysis report about the user's manipulation under the training program to the tutor panel.

5. The augmented reality training system of claim 2, further comprising an operable interface module coupled to the processor and configured to allow the user's operation for adjusting a focal plane or a ratio to zoom-in/-out of the augmented reality stereo microscopic assembly or for moving the augmented reality stereo microscopic assembly.

6. The augmented reality training system of claim 5, wherein the operable interface module is configured to further allow the user's operation for adjusting light.

7. The augmented reality training system of claim 2, wherein the augmented reality stereo microscopic assembly includes a camera module, an optical module and an eyepiece module, wherein the camera module is positioned in relation to the workspace to capture the real stereo videos, and the optical module is positioned with respect to the eyepiece module and the simulation generation module to transmit the augmented reality images into the user's eyes through the eyepiece module.

8. The augmented reality training system of claim 7, wherein the optical module includes lenses, prisms, mirrors, diffusers and beam splitters, and the augmented reality images are transmitted into the user's eyes through the lenses, the prisms, the mirrors, the diffusers and the beam splitters.

9. The augmented reality training system of claim 1, wherein the bottom digital camera is rotatably disposed below the workspace.

10. The augmented reality training system of claim 1, wherein the top digital camera and the bottom digital camera are infrared cameras.

11. The augmented reality training system of claim 10, further comprising a bottom light module disposed below the workspace to provide infrared light and visible light.

12. The augmented reality training system of claim 11, further comprising a top light module disposed above the workspace to provide infrared light and visible light.

13. The augmented reality training system of claim 12, wherein the marker is a reflective ball.

14. The augmented reality training system of claim 1, wherein the marker is an LED module.

15. The augmented reality training system of claim 1, further comprising a wireless power transmission module disposed adjacent to the manipulation platform to create an inductive field in the workspace.

16. The augmented reality training system of claim 1, wherein the surgical phantom includes an eye model having an artificial wound configured for permitting the instrument to be inserted into the eye model through the artificial wound.

17. The augmented reality training system of claim 16, wherein the eye model has a rigid bottom and a soft part on the rigid bottom, and the artificial wound is formed in the soft part.

18. The augmented reality training system of claim 16, wherein the training program is executed in the processor to set warning indicators on the edges of the artificial wound for indicating a warning when a collision with the instrument is detected.

19. The augmented reality training system of claim 16, wherein the training program is executed in the processor to provide at least one of the following training courses:
(i) the at least one virtual object being set in the virtual pupil area for recording positions of the instrument manipulated by the user during the training course for a preset period and analyzing motion ranges of the instrument to evaluate the user's antitremor skill;
(ii) the virtual pupil area including a virtual starting point and the at least one virtual object consisting of a plurality of virtual objects being set in the virtual pupil area for recording times and path the user takes to manipulate the instrument from touching the virtual starting point to touching the virtual objects at different heights to evaluate the user's depth sensing and navigation skill;
(iii) the virtual pupil area including a virtual reference circle, and the at least one virtual object including a virtual tracking curve drawn by the user for comparing with the virtual reference circle to evaluate the user's circular tracing skill;
(iv) the virtual pupil area including a virtual target point, and the at least one virtual object including a virtual target point being set in the virtual pupil area for recording times for grabbing the virtual object and dragging the virtual object to the virtual target point through a forceps manipulated by the user to evaluate the user's forceps handling skill; and
(v) the virtual pupil area including a virtual guidance curve and a virtual releasing point and the at least one virtual object being set in the virtual pupil area for recording times for grasping the virtual object and bringing the virtual object to the virtual releasing point along the virtual guidance curve through a forceps manipulated by the user to evaluate the user's capsulorhexis skill.

* * * * *